United States Patent
Dharmasena et al.

(10) Patent No.: US 11,424,509 B1
(45) Date of Patent: Aug. 23, 2022

(54) METHOD FOR COATING A SEPARATOR FOR A BATTERY

(71) Applicant: GM GLOBAL TECHNOLOGY OPERATIONS LLC, Detroit, MI (US)

(72) Inventors: Ruchira R. Dharmasena, Shelby Township, MI (US); Shuru Chen, Troy, MI (US); Fang Dai, Troy, MI (US); Mei Cai, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 17/172,609

(22) Filed: Feb. 10, 2021

(51) Int. Cl.
    *B05D 1/04* (2006.01)
    *H01M 50/403* (2021.01)
    *B05D 1/00* (2006.01)
    *B05D 1/02* (2006.01)
    *B05D 1/18* (2006.01)
    *H01M 10/05* (2010.01)

(52) U.S. Cl.
    CPC .......... *H01M 50/403* (2021.01); *B05D 1/007* (2013.01); *B05D 1/02* (2013.01); *B05D 1/04* (2013.01); *B05D 1/18* (2013.01); *H01M 10/05* (2013.01)

(58) Field of Classification Search
    CPC . B05D 1/007; B05D 1/02; B05D 1/04; B05D 1/045; B05D 1/18; B05D 3/02; H01M 50/403; H01M 10/05

USPC .................................................. 427/458, 115
    See application file for complete search history.

(56) References Cited

U.S. PATENT DOCUMENTS

| | | | | | |
|---|---|---|---|---|---|
| 2,898,279 | A | * | 8/1959 | Metcalfe | B05D 1/007 430/286.1 |
| 5,997,959 | A | * | 12/1999 | Lebioda | B05B 5/08 118/624 |
| 2011/0135810 | A1 | * | 6/2011 | Yakovleva | H01M 4/1393 252/182.1 |
| 2015/0318529 | A1 | * | 11/2015 | Whear | H01M 50/403 429/246 |
| 2016/0126521 | A1 | * | 5/2016 | Suonsivu | H01M 50/449 429/7 |
| 2017/0098818 | A1 | * | 4/2017 | Cheng | H01M 4/1393 |

FOREIGN PATENT DOCUMENTS

JP    2004031166    *   1/2004    ............. Y02E 60/50

* cited by examiner

*Primary Examiner* — Brian K Talbot
(74) *Attorney, Agent, or Firm* — Quinn IP Law (57) ABSTRACT

A method for coating a separator for a battery includes creating an electrostatic field and disposing a substrate material within the electrostatic field. The method further includes applying a coating material to the substrate material in a presence of the electrostatic field and drying the coating material upon the substrate material.

6 Claims, 8 Drawing Sheets

METHOD FOR COATING A SEPARATOR FOR A BATTERY

GOVERNMENT CONTRACT

This application was made with government support under contract no. DE-EE008230 awarded by the Department of Energy. The government has certain rights in the invention.

INTRODUCTION

The disclosure generally relates to a method for coating a separator for a battery.

Electric and hybrid electric vehicles utilize battery devices to store electrical energy. Vehicular batteries such as lithium-ion batteries include an anode, a cathode, and a separator providing a physical barrier between the anode and the cathode while enabling an exchange of ions across the separator.

SUMMARY

A method for coating a separator for a battery is disclosed. The method includes creating an electrostatic field and disposing a substrate material within the electrostatic field. The method further includes applying a coating material to the substrate material in a presence of the electrostatic field and drying the coating material upon the substrate material.

In some embodiments, creating the electrostatic field includes creating a positive charge upon a metallic tip and creating a negative charge upon a metallic sheet. In some embodiments, disposing the substrate within the electrostatic field includes placing the substrate material between the metallic tip and the metallic sheet.

In some embodiments, applying the coating material includes spray coating the coating material upon the substrate material.

In some embodiments, applying the coating material includes immersing the substrate material in a pool of precursor material.

In some embodiments, the substrate material includes a polyolefin sheet.

In some embodiments, the polyolefin sheet includes one of a polypropylene monolayer sheet, a polyethylene monolayer sheet, or a polypropylene/polyethylene/polypropylene sheet.

In some embodiments, the coating material includes a titanium dioxide and carbon black mixture.

According to one alternative embodiment, a method for coating a separator for a battery is disclosed. The method includes supplying a flow of a flexible substrate material from a supply roll, running the flow of the flexible substrate material around an applicator roller, and disposing a liquid precursor pool in contact with the applicator roller. The method further includes creating an electrostatic field by creating a positive charge upon a metal container for the liquid precursor pool and by creating a negative charge upon the applicator roller and immersing the flow of flexible substrate material running around the applicator roller within the liquid precursor pool to apply a coating material upon the substrate material in a presence of the electrostatic field. The method further includes drying the coating material upon the substrate material and coiling the substrate material upon a final product roll.

In some embodiments, the method further includes applying a second electrostatic field to the flow of flexible substrate material between the applicator roller and the final product roll.

In some embodiments, the method further includes utilizing a drying unit upon the flow of flexible substrate material between the applicator roller and the final product roll.

In some embodiments, the method further includes utilizing a drying unit upon the flow of flexible substrate material between the applicator roller and the final product roll.

In some embodiments, the flexible substrate material includes a flexible polyolefin including one of polypropylene monolayer, polyethylene monolayer, and polypropylene/polyethylene/polypropylene trilayer.

In some embodiments, the flexible substrate material further includes an aluminum foil backer.

In some embodiments, the coating material includes a titanium dioxide and carbon black mixture.

According to one alternative embodiment, an equipment configuration to apply a coating upon a separator for a battery includes a supply roll providing a flow of flexible substrate material and an applicator roller receiving and being in contact with the flow of flexible substrate material. The applicator roller includes a negative charge. The equipment configuration further includes a liquid precursor pool disposed in contact with the applicator roller and a metal container containing the liquid precursor pool. The metal container includes a positive charge. The equipment configuration further includes a final product roll receiving the flow of flexible substrate material from the applicator roller and coiling the flexible substrate material. The applicator roller including the negative charge and the metal container including the positive charge create an electrostatic field therebetween. The flow of flexible substrate material, while being in contact with the applicator roller, is immersed in and receives the coating within the liquid precursor pool. The coating is dried between the applicator roller and the final product roll.

In some embodiments, the positive charge includes a first positive charge and the negative charge includes a first negative charge. In some embodiments, the electrostatic field includes a first electrostatic field. In some embodiments, the equipment configuration further includes a metallic tip including a second positive charge and a metallic sheet creating a second negative charge. The metallic tip and the metallic sheet are disposed to create a second electrostatic field between the applicator roller and the final product roll.

In some embodiments, the equipment configuration further includes a drying unit disposed between the applicator roller and the final product roll.

In some embodiments, the flexible substrate material includes a flexible polyolefin including one of polypropylene monolayer, polyethylene monolayer, or polypropylene/polyethylene/polypropylene trilayer. In some embodiments, the flexible substrate material further includes an aluminum foil backer.

In some embodiments, the liquid precursor pool includes a slurry of titanium dioxide and carbon black mixture.

The above features and advantages and other features and advantages of the present disclosure are readily apparent from the following detailed description of the best modes for carrying out the disclosure when taken in connection with the accompanying drawings.

DETAILED DESCRIPTION

A coating method is provided to produce uniform and thin layer coating of metal particles, metal oxides particles, conductive carbon particles, and/or their mixtures, onto battery separators using electrostatic force. According to one embodiment, the method may be implemented in a roll-to-roll coating process. The coated separators may improve the performance and robustness of high energy density batteries.

Methods in the art to coat a membrane may include transitioning the membrane through a bath and drying the liquid of the bath upon the membrane. However, coatings created by methods in the art result in brittle coatings or coatings likely to peel away from the substrate or coatings likely to buckle or bend. The disclosed method creates a coated membrane without buckling or bending of the coating during drying. In one embodiment, the electrostatic field may be initially established and then the coating may be applied in the presence of the established electrostatic field. In another embodiment, the coating may be first applied to a substrate material, and then the electrostatic field may be subsequently established, with the substrate and the liquid coating material being disposed or moved into the electrostatic field.

The disclosed method utilizes electrostatic force to retain the separators on a substrate, for example, with the substrate embodied by an aluminum foil backer. Use of the electrostatic force enables formation of a controllable, thin, and uniform coating. The disclosed process is facile and quick to operate and may easily be scaled up at a low cost. Electrostatic force may be used to retain the separators on a metal foil substrate without buckling/bending during drying.

The coating utilized in the disclosed process may include a variety of coating source materials, including carbon, metal, oxides, and/or their mixtures. In one embodiment, the coating includes a titanium dioxide/carbon black mixture. Electrostatic force is used to adhere polypropylene or similar membranes onto thin film metal substrates such as aluminum. Substrates may include a polyolefin (such as polypropylene (PP) monolayer, polyethylene (PE) monolayer and polypropylene/polyethylene/polypropylene (PP/PE/PP) trilayer) sheet. Electrostatic force may be used to uniformly spray coating materials onto separators and enhance the adhesion. Uniform coating enables fabrication of ion selective membranes which may be used in Li—S batteries, Li-ion batteries, and fuel cells. The disclosed process may include rapid drying of thin film membranes, for example, by passing heated air over the film membrane, thereby allowing roll to roll coating. The disclosed coating may be thin or microscopic, for example, provided as nanoparticles upon the separator.

Figure 1:
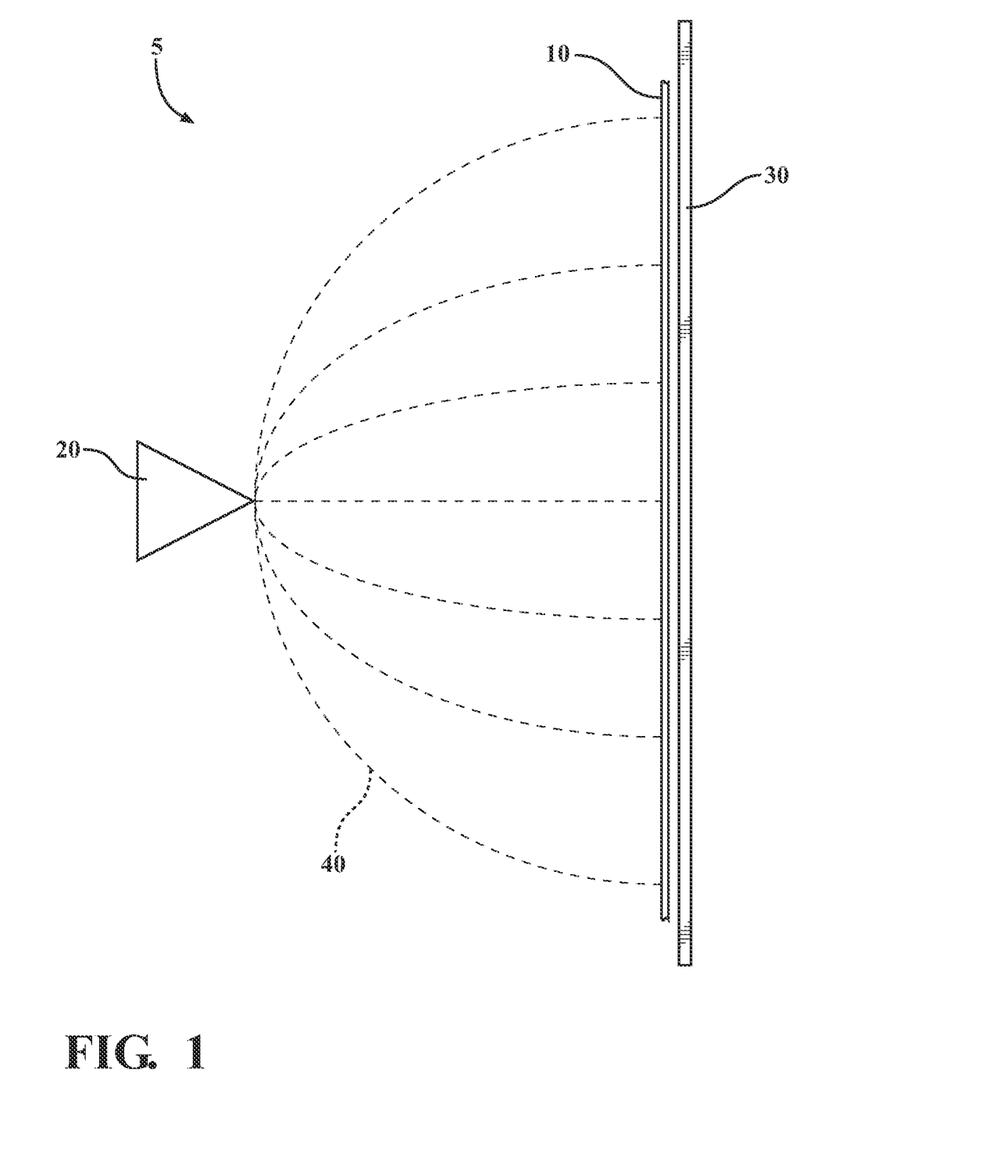
FIG. 1 schematically illustrates an exemplary equipment configuration 5 operable to utilize a method to coat separators for battery applications, accordance with the present disclosure.
Figure 2:
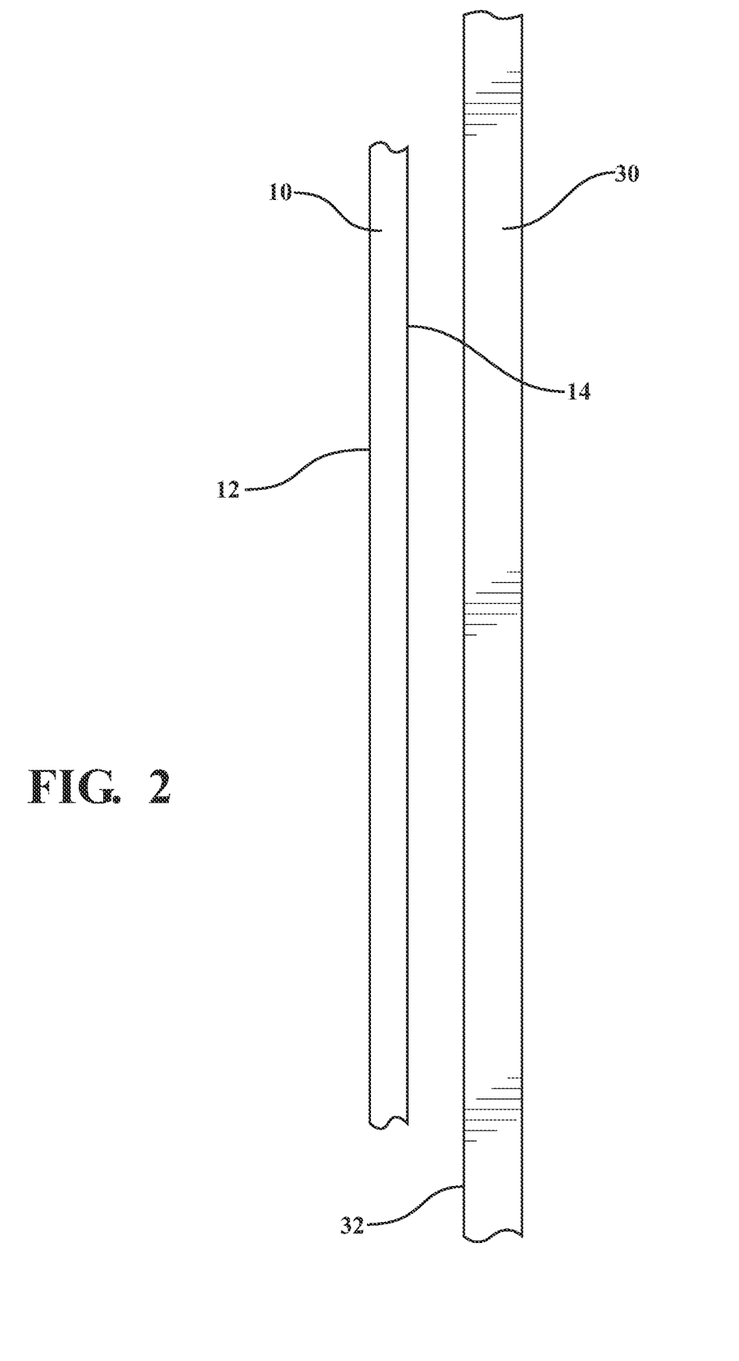
FIG. 2 schematically illustrates the negatively charged sheet 30 and the separator substrate of FIG. 1 in enlarged scale, accordance with the present disclosure.

FIG. 1 schematically illustrates an exemplary equipment configuration 5 operable to utilize a method to coat separators for battery applications. The equipment configuration 5 is illustrated including a positively charged tip 20 and a negatively charged sheet 30. The positively charged tip 20 may include a conductive metallic part with a triangular cross-section. A difference in electrostatic charge between the positively charged tip 20 and the negatively charged sheet 30 create an electrostatic field 40 extending between the positively charged tip 20 and the negatively charged sheet 30. A separator substrate 10 is provided as an exemplary substrate in a presence of the electrostatic field 40. By being applied to separator substrate 10 in the presence of the electrostatic field 40, coating particles, for example, as applied through a spray coating, are electrostatically adhered to the substrate. FIG. 2 schematically illustrates the negatively charged sheet 30 and the separator substrate 10 of FIG. 1 in enlarged scale. The negatively charged sheet 30 is illustrated including a first surface 32. An entirety of the negatively charged sheet 30 including the first surface 32 includes a negative charge, which may be induced by attachment of the negatively charged sheet 30 to a negative terminal of a direct current power source. The separator substrate 10 is illustrated and exists within the electrostatic field 40 of FIG. 1. As a result, a negative charge/positive charge separation exists across the separator substrate 10, with a negative charge existing on a first surface 12 of the separator substrate 10 and a positive charge existing on a second surface 14 of the separator substrate 10. The negative charge upon the first surface 12 attracts the coating particles and electrostatically adhere the coating particles upon the first surface 12 of the separator substrate 10. The separator substrate 10 may be constructed of many different materials. In one embodiment, the separator substrate 10 may be a polypropylene separator.

Figure 3:
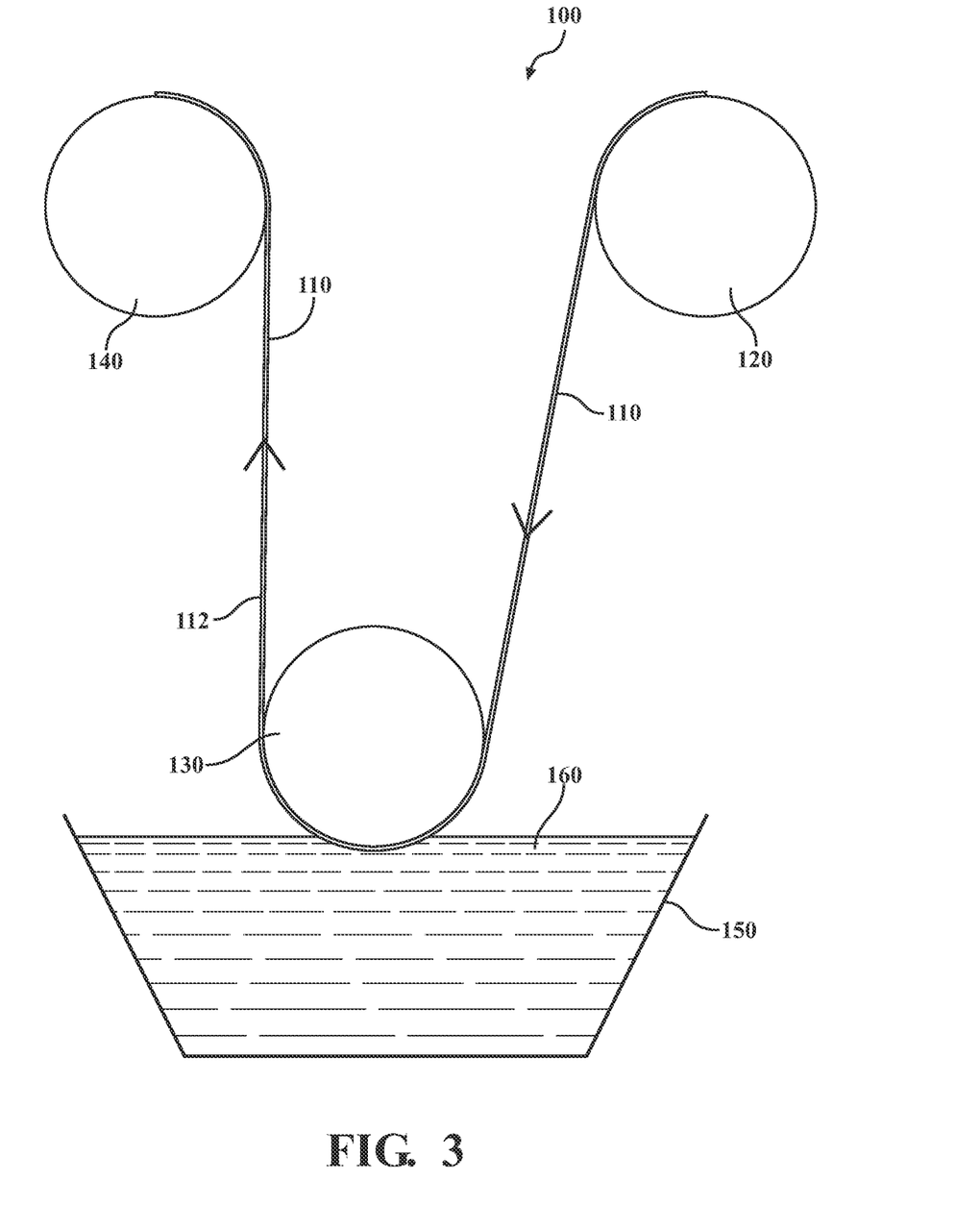
FIG. 3 illustrates an exemplary equipment configuration 100 operable to utilize a method to coat separators for battery applications in a roll-to-roll operation, accordance with the present disclosure.

FIG. 3 illustrates an exemplary equipment configuration 100 operable to utilize a method to coat separators for battery applications in a roll-to-roll operation. The equipment configuration 100 includes a supply roll 120, an applicator roller 130, and a finished product roll 140. The supply roll 120, the applicator roller 130, and the finished product roll 140 are collectively operable to transfer a supply of flexible substrate material 110 from the supply roll 120, over the applicator roller 130, and onto the finished product roll 140. In one embodiment, the flexible substrate material 110 may be a polypropylene sheet. In one embodiment, the polypropylene sheet may be provided upon an aluminum foil backer. As the flexible substrate material 110 transitions from the supply roll 120 to the applicator roller 130, the flexible substrate material 110 conforms to the outer shape of the applicator roller 130 and moves through a liquid precursor pool 160 contained within container 150. The liquid precursor pool 160 may include the particles which are intended to be provided upon the flexible substrate material 110 as a coating. In one embodiment, the liquid precursor pool 160 may include titanium dioxide ($TiO_2$).

The container 150 may be constructed of a conductive metallic material and may be positively charged. The applicator roller 130 may be metallic or may contain a metallic portion, the applicator roller 130 may be negatively charged. By creating a positive charge upon the container 150 and a negative charge upon the applicator roller 130, an electrostatic field may be created between the container 150 and the applicator roller 130. As the flexible substrate material 110 moves through the liquid precursor pool 160, particles from the liquid precursor pool 160 are adhered to the flexible substrate material 110 in a presence of the electrostatic field created by the positive charge of the container 150 and the negative charge of the applicator roller 130. As a result, a coating 112 is provided upon the flexible substrate material 110. The flexible substrate material 110 including the coating 112 progresses to the final product roll 140 where it is coiled upon the final product roll 140 for storage.

Figure 4:
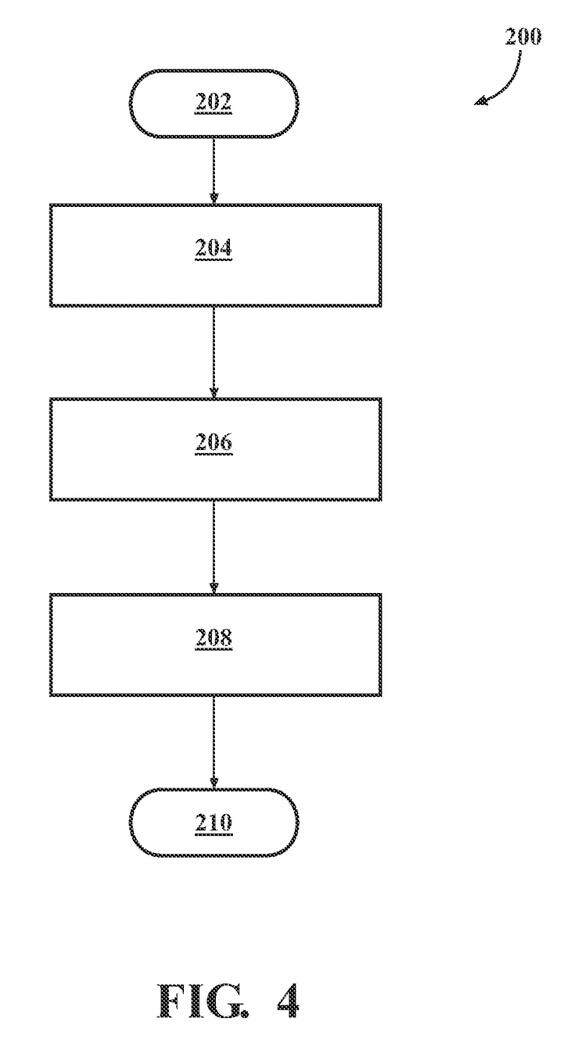
FIG. 4 illustrates a method to coat separators for battery applications, accordance with the present disclosure.

FIG. 4 illustrates a method 200 to coat separators for battery applications. The method 200 starts at step 202. At step 204, an electrostatic field is created, a substrate material is disposed within the electrostatic field. At step 206, a coating material is applied to the substrate material in the presence of the electrostatic field. The application of the coating material may include spraying or brushing the coating material upon the substrate, dipping or immersing the substrate material in a coating material pool, or other similar application processes. At step 208, the coating material is dried upon the substrate material. At step 210, the method 200 ends. A number of additional or alternative steps are envisioned, and the disclosure is not intended to be limited to the exemplary method steps provided herein.

Figure 5:
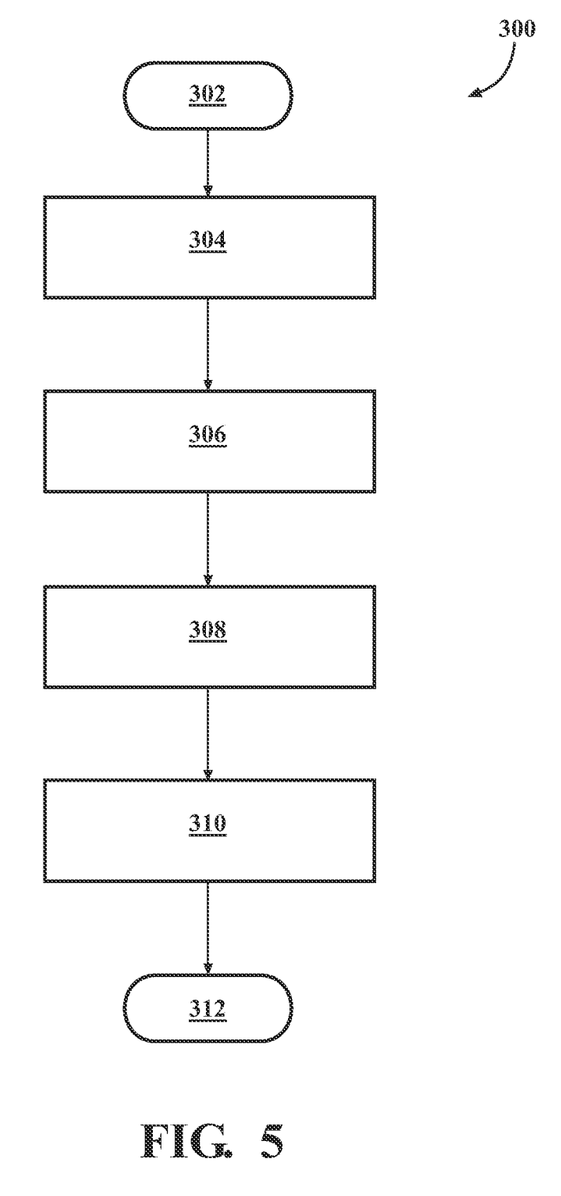
FIG. 5 illustrates a method to coat separators for battery applications in a roll-to-roll operation, accordance with the present disclosure.

FIG. 5 illustrates a method 300 to coat separators for battery applications in a roll-to-roll operation. The method 300 starts at step 302. At step 304, a supply roll of flexible substrate material is provided to supply a flow of flexible substrate material. At step 306, an electrostatic field is created between an applicator roller and a metallic precursor pool container. At step 308, the flow of flexible substrate material is moved through a pool of liquid precursor material within the metallic precursor pool container, such that the flexible substrate material is immersed in the liquid precursor material in the presence of the electrostatic field which results in the flexible substrate material being coated with the liquid precursor material. The pool of liquid precursor material may include titanium dioxide or a slurry of titanium dioxide and carbon black material. At step 310, the flow of flexible substrate material is coiled upon a final product roll. The liquid precursor material upon the flexible substrate material dries upon the flexible substrate material as it transitions between the applicator roller and the final product roll. At step 312, the method 300 ends. A number of additional or alternative steps are envisioned, and the disclosure is not intended to be limited to the exemplary method steps provided herein.

Figure 6:
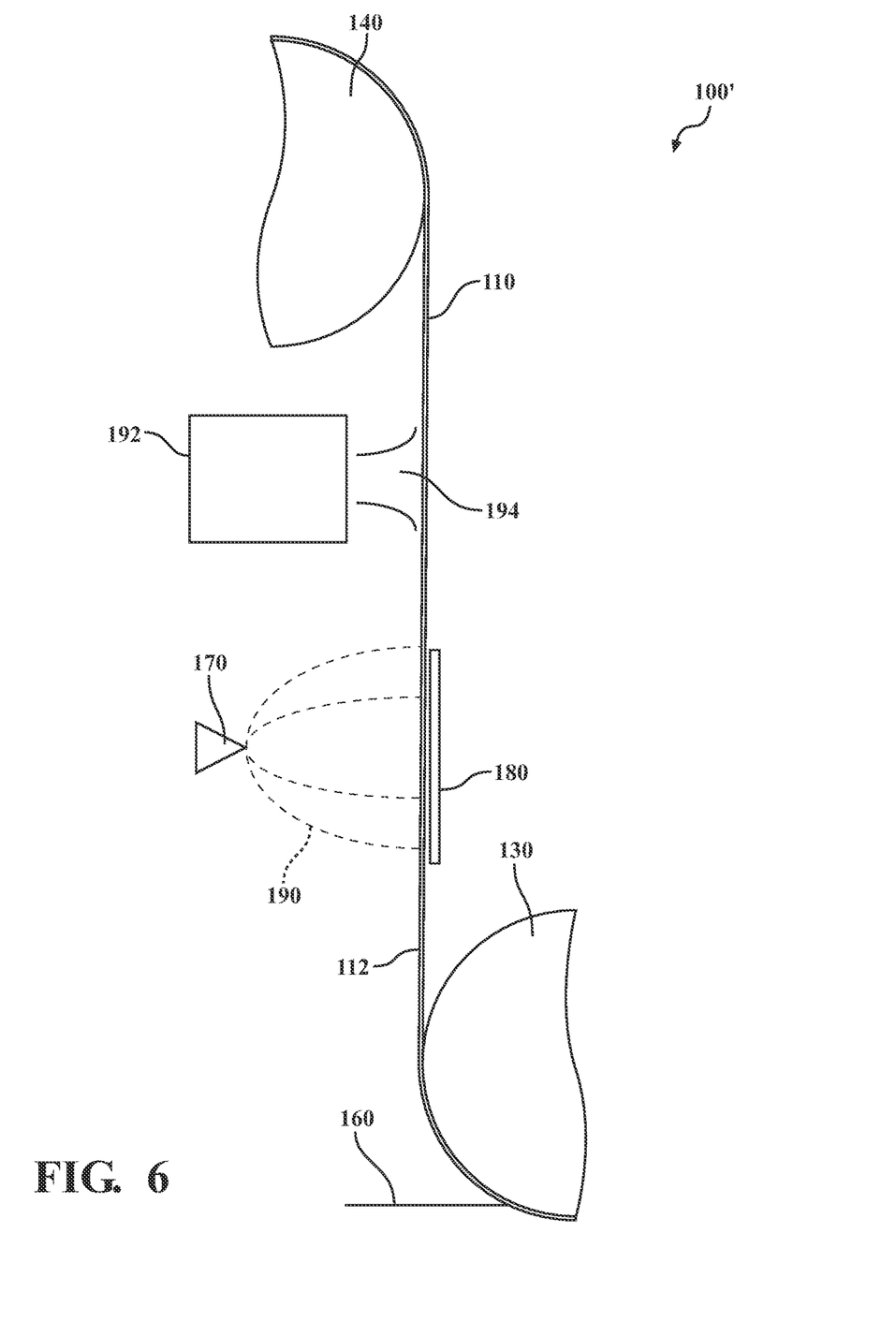
FIG. 6 schematically illustrates a portion of an equipment configuration operable to utilize a method to coat separators for battery applications in a roll-to-roll operation, accordance with the present disclosure.

FIG. 6 schematically illustrates a portion of an equipment configuration 100' operable to utilize a method to coat separators for battery applications in a roll-to-roll operation. The equipment configuration 100' is similar to the equipment configuration 100 of FIG. 3 and includes the applicator roller 130, the liquid precursor pool 160, the flexible substrate material 110, and the final product roll 140. The coating 112 is illustrated upon the flexible substrate material 110 transitioning from the applicator roller 130 to the final product roll 140. A positively charged tip 170 and a negatively charged plate 180 are illustrated creating an electrostatic field 190. Because the liquid precursor material of the coating 112 is in liquid form, the electrostatic field 190 may electrostatically adhere the liquid precursor material of coating 112 to the flexible substrate material 110. In one embodiment, the electrostatic field 190 may be applied in the alternative to the electrostatic field described in FIG. 3 in relation to the container 150 and the applicator roller 130. In another embodiment, the electrostatic field described in FIG. 3 may be applied in the configuration of FIG. 6, and the electrostatic field 190 may be an auxiliary or second electrostatic field. A drying unit 192 is illustrated providing a flow of heated air 194 upon the flexible substrate material 110 to dry the coating 112. In another embodiment, the drying unit 192 may alternatively include a heat lamp or similar device to heat and dry the coating 112.

Figure 7:
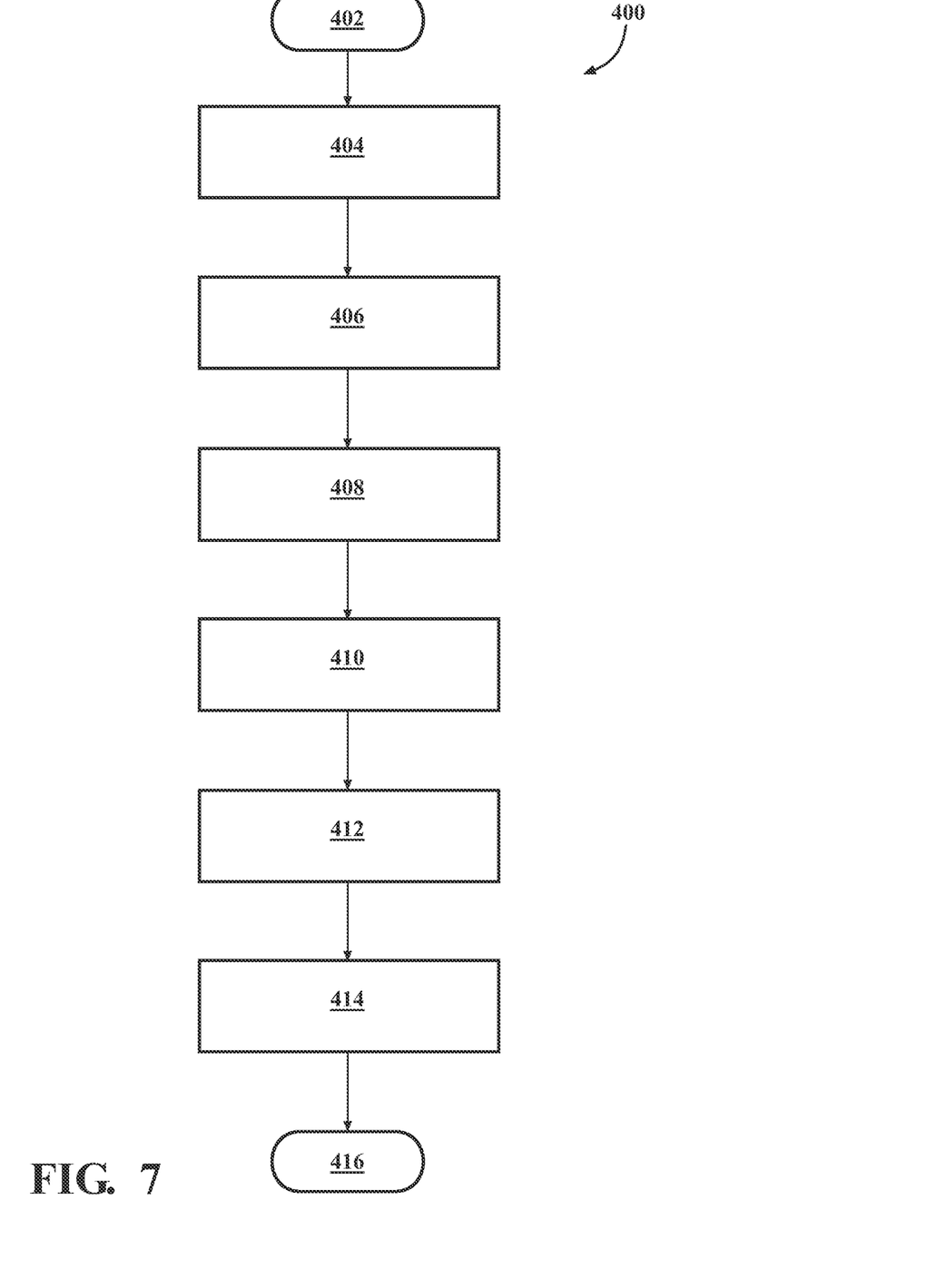
FIG. 7 illustrates an alternative method to coat separators for battery applications in a roll-to-roll operation, accordance with the present disclosure.

FIG. 7 illustrates an alternative method 400 to coat separators for battery applications in a roll-to-roll operation. The method 400 starts at step 402. At step 404, a supply roll of flexible substrate material is provided to supply a flow of flexible substrate material. At step 406, an electrostatic field is created between an applicator roller and a metallic precursor pool container. At step 408, the flow of flexible substrate material is moved through a pool of liquid precursor material within the metallic precursor pool container, such that the flexible substrate material is immersed in the liquid precursor material in the presence of the electrostatic field which results in the flexible substrate material being coated with the liquid precursor material. At step 410, an auxiliary or second electrostatic field is created between the applicator roller and a final product roll, and the flow of flexible substrate material is moved through the second electrostatic field. At step 412, a drying unit is used to dry the coating upon the flow of flexible substrate material. At step 414, the flow of flexible substrate material is coiled upon the final product roll. At step 416, the method 400 ends. A number of additional or alternative steps are envisioned, and the disclosure is not intended to be limited to the exemplary method steps provided herein.

Figure 8:
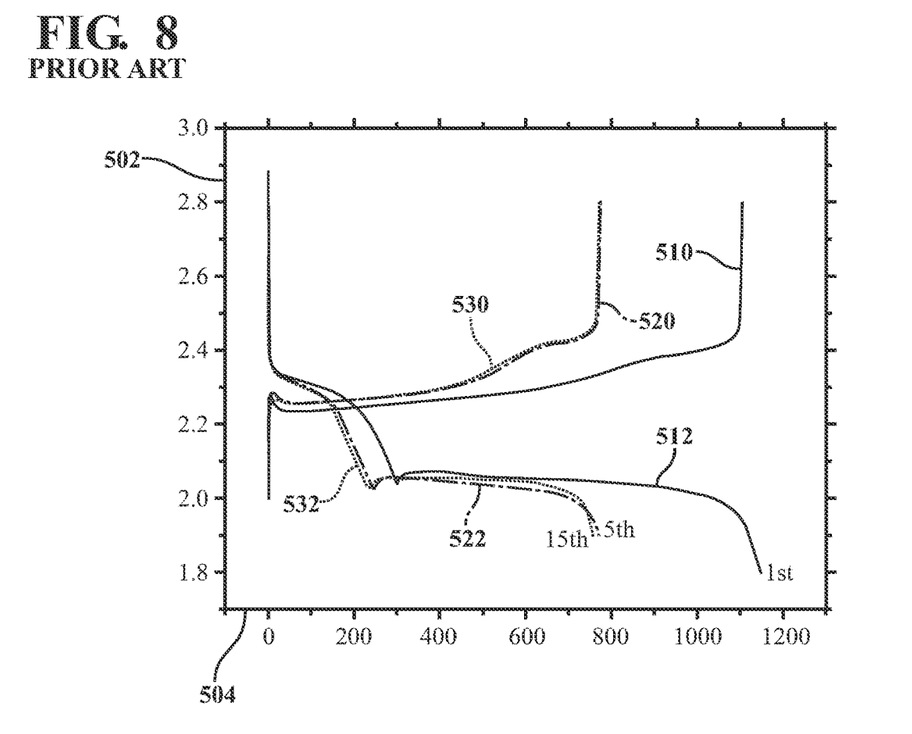
FIG. 8 graphically illustrates test results from a prior art battery system, accordance with the present disclosure.
Figure 9:
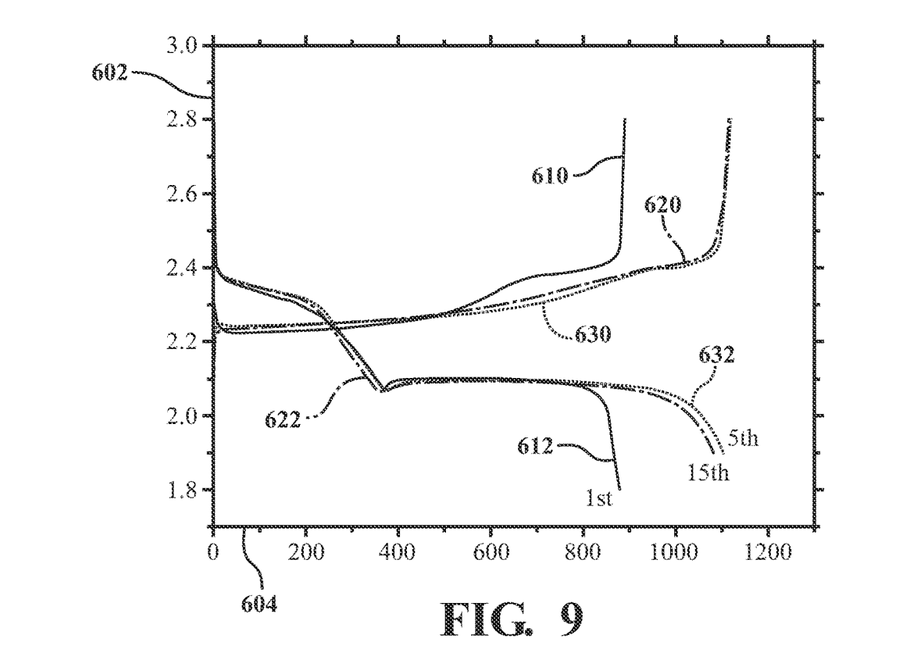
FIG. 9 graphically illustrates test results from a battery system utilizing a separator created with the disclosed method, accordance with the present disclosure.

As an example, the disclosed method can be used for coating Titania ($TiO_2$) nanoparticles and carbon black mixture on polypropylene (PP) separators, which can be used in lithium-sulfur batteries to improve their capacities and cell cycle life. FIG. 8 graphically illustrates test results from a lithium-sulfur battery system. A vertical axis 502 represents potential Volts ($Li/Li^+$). A horizontal axis 504 represents gravimetric capacity (mAh $g^{-1}$) which describes a capacity of the battery per unit mass of sulfur cathode. The test data is generated at 0.1 C discharge/charge rate after first formation cycle at 0.05 C rate. Potential vs. specific capacity curves in the test data correspond to a sulfur cathode with an uncoated polypropylene separator. Plot 510 represents a first charging cycle. Plot 520 represents a fifth charging cycle. Plot 530 represents a fifteenth charging cycle. Plot 512 represents a first discharging cycle. Plot 522 represents a fifth discharging cycle. Plot 532 represents a fifteenth discharging cycle. FIG. 9 graphically illustrates test results from a lithium-sulfur battery system utilizing a separator created with a layer of $TiO_2$/carbon (90:10 mass ratio) with a thickness of 10 um using the disclosed method. A vertical axis 602 represents potential Volts ($Li/Li^+$). A horizontal axis 604 represents gravimetric capacity (mAh $g^{-1}$). The test data is generated at 0.1 C discharge/charge rate after first formation cycle at 0.05 C rate. Potential vs. specific capacity curves in the test data correspond to a sulfur cathode with an uncoated polypropylene separator. Plot 610 represents a first charging cycle. Plot 620 represents a fifth charging cycle. Plot 630 represents a fifteenth charging cycle. Plot 612 represents a first discharging cycle. Plot 622 represents a fifth discharging cycle. Plot 632 represents a fifteenth discharging cycle. In FIG. 8, first cycle gravimetric capacity is observed around 1200 mAh $g^{-1}$ at 0.05 C discharge/charge rate. When increasing discharge rate to 0.1 C starting from 2nd cycle, the specific capacity decreases to around 800 mAh $g^{-1}$. FIG. 9 shows that the first cycle of the lithium-sulfur battery with $TiO_2$/carbon coated separator gives a gravimetric capacity of 950 mAh $g^{-1}$ which is lower than the initial capacity with un-coated PP separator. But from the first cycle onward, higher stable gravimetric capacity of ~1100 mAh $g^{-1}$ at 0.1 C was observed. Comparing the plots of FIG. 8 with the plots of FIG. 9, improvement in gravimetric capacity of a lithium-sulfur battery with a separator with a functional coating is apparent. This proves that $TiO_2$/carbon coating on separator by the disclosed method can adsorb and re-utilize the polysulfides which dissolve into the electrolyte from sulfur cathode during discharge process, thus mitigating the substation capacity loss of lithium-sulfur batteries.

While the best modes for carrying out the disclosure have been described in detail, those familiar with the art to which this disclosure relates will recognize various alternative designs and embodiments for practicing the disclosure within the scope of the appended claims.

What is claimed is:

1. A method for coating a separator for a battery, comprising:
    providing a flow of a metal foil backer over a plurality of rollers;
    creating an electrostatic field;
    disposing a substrate material provided upon the metal foil backer within the electrostatic field, wherein the electrostatic field acts to retain the substrate material upon the metal foil backer and thereby take a flat shape of the metal foil backer and wherein the substrate material includes a polyolefin sheet;
    applying a coating material to the substrate material in a presence of the electrostatic field, wherein the electrostatic field is used to uniformly apply the coating material to the substrate material; and
    in an operation subsequent to applying the coating material, drying the coating material upon the substrate material, wherein disposing the substrate material provided upon the metal foil backer within the electrostatic field, applying the coating material to the substrate material in the presence of the electrostatic field, and the operation are configured for drying the coating material upon the substrate material without buckling or bending.

2. The method of claim 1, wherein creating the electrostatic field includes creating a positive charge upon a metallic tip and creating a negative charge upon a metallic sheet; and
    wherein disposing the substrate material within the electrostatic field includes placing the substrate material between the metallic tip and the metallic sheet.

3. The method of claim 1, wherein applying the coating material includes spray coating the coating material upon the substrate material.

4. The method of claim 1, wherein applying the coating material includes immersing the substrate material in a pool of precursor material.

5. The method of claim 1, wherein the polyolefin sheet includes one of a polypropylene monolayer sheet, a polyethylene monolayer sheet, or a polypropylene/polyethylene/polypropylene sheet.

6. The method of claim 1, wherein the coating material includes a titanium dioxide and carbon black mixture.

* * * * *